No. 645,415. Patented Mar. 13, 1900.
W. R. WRIGHT.
BAKING VESSEL OR MOLD.
(Application filed Nov. 18, 1897. Renewed June 27, 1899.)
(No Model.)
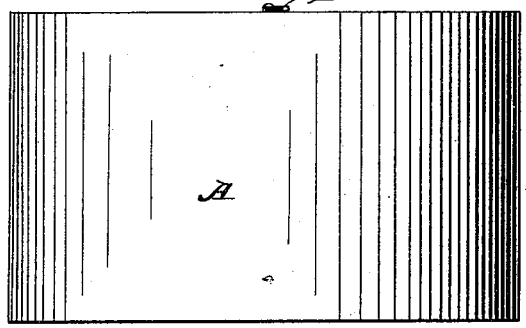
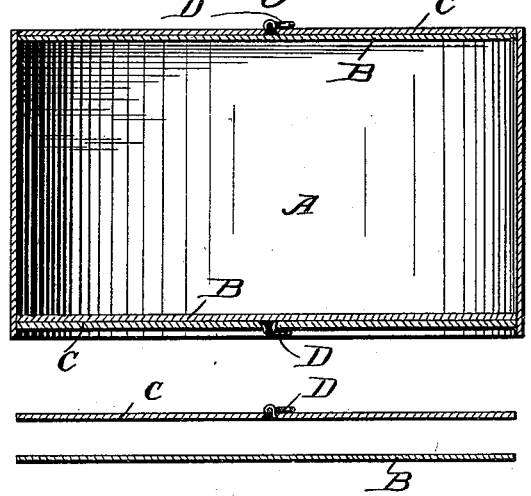
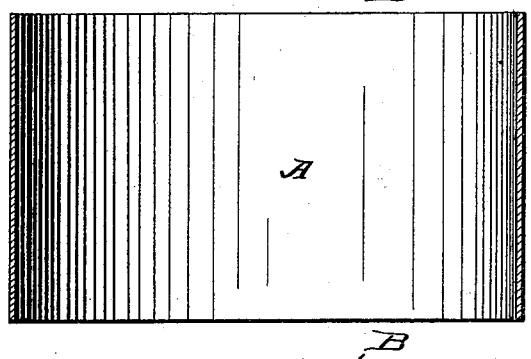
Witnesses:
Jo. H. Milans.
Chas. W. Parker.
Inventor:
William R. Wright
By H. W. Phillips
Att'y.

UNITED STATES PATENT OFFICE.

WILLIAM R. WRIGHT, OF MARQUETTE, MICHIGAN.

BAKING VESSEL OR MOLD.

SPECIFICATION forming part of Letters Patent No. 645,415, dated March 13, 1900.

Application filed November 18, 1897. Renewed June 27, 1899. Serial No. 722,072. (No model.)

*To all whom it may concern:*

Be it known that I, WILLIAM R. WRIGHT, a citizen of the United States, residing at Marquette, in the county of Marquette and State of Michigan, have invented a certain new and useful Improvement in Baking Vessels or Molds; and I do hereby declare the following to be a full, clear, and exact description of the invention, such as will enable others skilled in the art to which it appertains to make and use the same.

This invention relates to an improvement in the mold or vessel in which cake or other food may be baked; and it is embodied in the construction and arrangement of the same, as hereinafter described and shown.

The objects of this invention are the provision of a mold or vessel formed of paper or an analogous material of sufficient rigidity or stiffness to be self-shape-retaining and which is capable of being used for baking purposes as an ordinary metallic baking-pan is used, and the production of such a mold or vessel which can be once used and destroyed or allowed to remain upon the article baked therein or sold or disposed of with the same, and to provide a mold or vessel of the character described which will more evenly and uniformly bake than will a metallic vessel and which will not burn or form a hard crust on the article being baked.

One form of the invention is illustrated in the accompanying drawings, wherein like letters of reference designate corresponding parts in the several views.

In the drawings, Figure 1 is an elevation of the device. Fig. 2 is a central longitudinal section, and Fig. 3 is a similar view showing the closures separated from the device.

In the drawings, A designates a paper casing, vessel, or mold. The vessel or mold is open at both ends and is preferably cylindrical in form. Other forms, however, can be used when desired. The vessel or mold is preferably formed of stiff material, such as cardboard or paper-board. In the form shown the ends of the mold or vessel are provided with removable disks or caps B and B, which snugly fit within the ends of the holder and are also provided with removable closures or caps C and C. These caps are preferably of paper-board or cardboard and are provided with rings D, by which the ends of the caps may be easily removed.

I use the term "stiff material" in this specification to indicate material having sufficient rigidity to be self-shape-retaining while being used as and for the purpose described.

In use the dough or cake material is filled into the vessel or mold, one end of the same being in place. The other end of the same is then closed. After baking the cake is allowed to remain therein until it is desired to use the same. The invention is especially useful in connection with the baking and preserving of what is commonly called "fruit-cake," and by actual experiment and test I have found that the cakes are well baked without burning.

My mold has all of the advantages of a metal pan or metal pan provided with a paper lining and has the further advantages of being cheaper, of more perfectly performing the baking operation, of preventing burning or uneven baking of the article, and of constituting a receptacle in which the article is retained until it is used.

Having thus described the invention, what I claim as new, and desire to secure by Letters Patent, is—

A baking-mold comprising a body in the form of a closed ring of stiff paper, and detached stiff-paper ends inserted in the opposite ends of the ring for closing the two open ends of said body, whereby is provided a completely-closed baking-mold and air-excluding retaining-receptacle substantially as described.

In testimony whereof I affix my signature in the presence of two witnesses.

WILLIAM R. WRIGHT.

Witnesses:
 JOHN HEFFERNAN,
 SAML. E. BYRNE.